United States Patent
Okumura

(10) Patent No.: US 9,952,496 B2
(45) Date of Patent: Apr. 24, 2018

(54) PANORAMIC PHOTOGRAPHY HEAD AND PHOTOGRAPHY SYSTEM USING THE SAME

(71) Applicant: ENTANIYA CO., LTD., Tokyo (JP)

(72) Inventor: Masaki Okumura, Tokyo (JP)

(73) Assignee: Entaniya Co., Ltd., Tokyo (JP)

( * ) Notice: Subject to any disclaimer, the term of this patent is extended or adjusted under 35 U.S.C. 154(b) by 0 days.

(21) Appl. No.: 15/649,226

(22) Filed: Jul. 13, 2017

(65) Prior Publication Data

US 2017/0307972 A1    Oct. 26, 2017

Related U.S. Application Data

(62) Division of application No. 14/764,826, filed as application No. PCT/JP2014/057063 on Mar. 17, 2014.

(30) Foreign Application Priority Data

Mar. 26, 2013  (JP) .................................. 2013-065201

(51) Int. Cl.
G03B 17/00      (2006.01)
G03B 11/00      (2006.01)
(Continued)

(52) U.S. Cl.
CPC ........... *G03B 37/04* (2013.01); *F16M 11/041* (2013.01); *F16M 13/04* (2013.01); *G03B 11/045* (2013.01);
(Continued)

(58) Field of Classification Search
USPC ................................ 396/419–428, 544–545
See application file for complete search history.

(56) References Cited

U.S. PATENT DOCUMENTS 4,946,272 A  *  8/1990  Brown .................... F16M 13/04
                                                            352/243
5,903,995 A  *  5/1999  Brubach ................. F41A 23/06
                                                            42/90
(Continued)

FOREIGN PATENT DOCUMENTS

FR    2 907 324 A3  *  4/2008 ......... A47G 23/0306
JP    5-188506 A       7/1993
(Continued)

*Primary Examiner* — Hung Dang
(74) *Attorney, Agent, or Firm* — Muncy, Geissler, Olds & Lowe, P.C.

(57) ABSTRACT

A panoramic photography head for easily photographing a plurality of images having different orientations without any vignetting in order to generate a panoramic image and to provide a photography system using the panoramic photography head are provided. A panoramic photography system includes: a digital camera body with a lens having a predetermined field of view at a front end thereof and can photograph a digital image; a panoramic photography head connected to a lower surface of the digital camera body; and a legged platform connected to a lower surface of the panoramic photography head. The panoramic photography head includes: an approximately horizontal upper plate having a second connector for realizing non-rotatably connection to the first connector; a vignetting preventing extension that is bent downward from the upper plate to secure a predetermined gap so as to prevent the panoramic photography head and the legged platform from being photographed in an image; and a lower plate that extends approximately horizontally and toward a front side from a lower end of the vignetting preventing extension and has a legged platform connector for connection to the legged platform. The legged platform connector is positioned vertically under a nodal point of the lens.

1 Claim, 9 Drawing Sheets

(51) Int. Cl.
*H04N 7/00* (2011.01)
*G03B 37/04* (2006.01)
*H04N 5/225* (2006.01)
*G03B 17/56* (2006.01)
*G03B 11/04* (2006.01)
*F16M 11/04* (2006.01)
*G03B 37/00* (2006.01)
*F16M 13/04* (2006.01)
*H04N 5/232* (2006.01)

(52) U.S. Cl.
CPC ......... *G03B 17/561* (2013.01); *G03B 17/563* (2013.01); *G03B 37/00* (2013.01); *H04N 5/2251* (2013.01); *H04N 5/2253* (2013.01); *H04N 5/23238* (2013.01)

(56) References Cited

U.S. PATENT DOCUMENTS

| | | |
|---|---|---|
| 2003/0147641 A1 | 8/2003 | Haney |
| 2004/0099850 A1* | 5/2004 | Schaefer ............... B66F 3/247 254/93 R |
| 2004/0246705 A1* | 12/2004 | Lu .................. A47G 23/0309 362/101 |
| 2005/0056739 A1* | 3/2005 | Koning ................. F16M 11/16 248/171 |
| 2006/0037241 A1* | 2/2006 | Orschulik .............. A01G 9/021 47/65.5 |
| 2006/0278797 A1* | 12/2006 | Keng ..................... F41A 23/10 248/440.1 |
| 2007/0152117 A1* | 7/2007 | Byrd ..................... F16M 11/08 248/187.1 |
| 2008/0203264 A1* | 8/2008 | Lombard ............... A47G 23/03 248/346.11 |
| 2010/0003026 A1* | 1/2010 | Kleppe .................. F16M 11/28 396/419 |
| 2010/0098405 A1* | 4/2010 | Coppola ............. F16M 11/045 396/428 |
| 2010/0155549 A1* | 6/2010 | Robinson ............... F16M 11/10 248/183.1 |
| 2010/0172642 A1* | 7/2010 | Orf ...................... F16M 11/041 396/421 |
| 2011/0079686 A1* | 4/2011 | Palik ..................... F16M 11/32 248/161 |
| 2011/0188847 A1* | 8/2011 | McKay ................ F16M 11/041 396/421 |
| 2011/0192951 A1* | 8/2011 | Gooch ................... F16M 11/12 248/316.7 |
| 2012/0025052 A1* | 2/2012 | Brown ................... A47G 23/03 248/346.11 |
| 2013/0287386 A1* | 10/2013 | Xu ....................... F16M 11/041 396/428 |

FOREIGN PATENT DOCUMENTS

| | | |
|---|---|---|
| JP | 3034735 U | 12/1996 |
| JP | 11-18007 A | 1/1999 |
| JP | 2000-112048 A | 4/2000 |
| JP | 2004-126303 A | 4/2004 |
| JP | 2006-178097 A | 7/2006 |
| WO | WO 2008/031129 A1 * | 3/2008 ............ F16M 13/04 |

* cited by examiner

PANORAMIC PHOTOGRAPHY HEAD AND PHOTOGRAPHY SYSTEM USING THE SAME

CROSS-REFERENCE TO RELATED APPLICATIONS

This application is a Divisional of co-pending application Ser. No. 14/764,826 filed on Nov. 30, 2015, which is a U.S. National Stage of International Application No. PCT/JP2014/057063 filed on Mar. 17, 2014, for which priority is claimed under 35 U.S.C. § 120; and this application claims priority of Application No. 2013-065201 filed in Japan on Mar. 26, 2013 under 35 U.S.C. § 119; the entire contents of all of which are hereby incorporated by reference.

TECHNICAL FIELD

The present invention relates to a panoramic photography head for photographing a plurality of images used for generating a panoramic image and a photography system thereof, and more particularly, to a technique for easily realizing high-quality photographing while preventing vignetting during photographing.

BACKGROUND ART

A technique of photographing a plurality of images having different orientations using a digital camera to generate a panoramic image having a wider field of view than one image by image processing of combining the image data of the plurality of images is known. Various methods of utilizing such panoramic image are known such as expressing the views of the interior or the surrounding of an object in an easy-to-understand manner as an advertisement of a real estate and showing an exhibition of visually reproducing the space of a museum rather than showing just a bird's-eye view image as in the related art.

With the spread of high-performance terminals such as smartphones having a digital photographing function, anyone can easily photograph an image and share the image on the Internet or the like, and a general demand for generating attractive contents is very high.

"360 Panorama" (see Non-Patent Literature 1) (product of Occipital Inc.) is an example of an application that provides a function of allowing users to photograph a panoramic image using a smartphone. With this application, it is possible to reproduce an image in an arbitrary direction from a photographing point by continuously photographing a number of images adjacent in vertical and horizontal directions using a digital photographing function and pasting the images to the inner surface of an imaginary sphere by image processing in a main body.

Such a simple panoramic image generation function is sufficient for enjoying as a hobby but has a problem in that the image quality is low for using as commercial advertisements or exhibitions in a museum. Thus, equipment in which a digital single-lens reflex camera having a wide-angle lens attached thereto and a special head are combined is generally used for such a purpose of photographing. For example, "Nodal Ninja 4" (see Non-Patent Literature 2) (product of Fanotec Corporation) is a head mounted on a tripod, capable of holding a digital single-lens reflex camera at an arbitrary angle and fixing the camera so that a nodal point of the lens corresponds to the center of rotation.

The following patent literatures disclose apparatuses for photographing panoramic images.

First, Patent Literature 1 proposes a camera for photographing panoramic pictures in which a rotation jig of which the center of rotation is at a first principal point of a lens is arranged. The rotation jig is a technique of allowing users to photograph panoramic pictures easily, and a user rotates a camera body with his or her hands using the rotation jig to perform photographing sequentially. Patent Literature 1 discloses that a rotation angle is determined using a rotation angle meter or an orientation is determined using a stopper or the like that prevents a rotation of a camera from a set rotation angle.

The technique disclosed in Patent Literature 2 proposes that a nodal point of a principal lens is set to the position of a tripod attachment screw hole formed in a camera itself. Thus, a special jig for aligning the nodal point to the center of rotation is not required, and an accurate panoramic picture material with no parallax can be photographed using a panoramic photography head and a tripod.

CITATION LIST

Patent Literature

Patent Literature 1: Japanese Unexamined Patent Publication No. H05-188506
Patent Literature 2: Japanese Unexamined Patent Publication No. 2006-178097

Non-Patent Literature

Non-Patent Literature 1: Internet URL (http://occipital.com/360/app) retrieved Feb. 12, 2013
Non-Patent Literature 2: Internet URL (http://shop.nodalninja.com/nodal-ninja-4-1/) retrieved Feb. 12, 2013

SUMMARY OF INVENTION

Technical Problem

In the conventional techniques, although a jig for rotating on a vertical line of the nodal point of a lens is proposed, the head used in a digital single-lens reflex camera has a complex structure and has a drawback in handling. Moreover, a head in which the position of a tripod attachment screw hole is on the vertical line of the nodal point is good for carrying. However, unless the head is placed on a tripod, it is difficult to photograph images while rotating and the usage thereof is limited.

In particular, when an ultrawide-angle lens is used, the occurrence of vignetting in which a jig, a tripod, the body of a photographer, or the like are imaged is a great problem. Conventionally, respective portions are configured to be adjustable to cope with a camera body and the angle of view of a lens used is not constant. Thus, vignetting can only be prevented through experience. Thus, there is a demand for a tool that a photographer can grasp stably and that does not cause any vignetting.

The present invention has been made in view of the problems of the conventional techniques and an object thereof is to provide a panoramic photography head for easily photographing a plurality of images having different orientations without any vignetting in order to generate a panoramic image and to provide a photography system using the same.

Solution to Problem

In order to solve the problems, the present invention provides the following panoramic photography systems.

That is, an invention disclosed is a panoramic photography system for photographing a plurality of images which are used for generating a panoramic image and of which the orientations are different, including: a digital camera body that has a lens having a predetermined field of view at a front end thereof and can photograph a digital image; a panoramic photography head connected to a lower surface of the digital camera body; a legged platform connected to a lower surface of the panoramic photography head.

In this configuration, a first connector for connection to the panoramic photography head is provided on the lower surface of the digital camera body, and the panoramic photography head includes: an approximately horizontal upper plate having a second connector for realizing non-rotatably connection to the first connector; a vignetting preventing extension that is bent downward from the upper plate to secure a predetermined gap so as to prevent the panoramic photography head and the legged platform from being photographed in an image; and a lower plate that extends approximately horizontally and toward a front side from a lower end of the vignetting preventing extension and has a legged platform connector for connection to the legged platform Moreover, the panoramic photography system is characterized in that the legged platform connector is positioned vertically under a nodal point of the lens.

The invention is characterized in that the legged platform is a monopod and the legged platform connector is non-rotatably connected to the legged platform.

The invention is characterized in that the panoramic photography head further includes: a support plate that extends toward a rear side from the lower plate; and a grip that is rotatably supported so as to extend approximately vertically downward from the support plate and is formed so that a user can grasp.

The invention is characterized in that the vignetting preventing extension of the panoramic photography head has a grip portion formed so that a user can grasp.

The invention is characterized in that the lower plate of the panoramic photography head has an upper surface that is inclined downward as the surface advances toward an outer side.

The invention is characterized in that the panoramic photography system further includes an approximately disk-shaped base plate mounted on a mounting surface, on which a monopod is placed, and each surface of the base plate includes: a recess in which a lower end of the monopod is placed at a center thereof so that alignment is realized easily; legs that make contact with the mounting surface at a plurality of contact points; and a direction indicator which includes a polygonal mark and in which a symbol is allocated to a side of the polygonal mark, the polygonal mark on one surface being different from that of the other surface.

The present invention can provide the following panoramic photography heads.

That is, the invention is a panoramic photography head used together with a digital camera body when photographing a plurality of images which are used for generating a panoramic image and of which the orientations are different, including: an approximately horizontal upper plate having a second connector for realizing non-rotatably connection to the digital camera body; a vignetting preventing extension that is bent downward from the upper plate to secure a predetermined gap so as to prevent the panoramic photography head from being photographed in an image; and a lower plate that extends approximately horizontally and toward a front side from a lower end of the vignetting preventing extension and has a legged platform connector for connection to the legged platform.

The panoramic photography head is characterized in that the legged platform connector is positioned vertically under a nodal point of a lens provided in the digital camera body.

The invention is characterized in that the panoramic photography head further includes a support plate that extends toward a rear side from the lower plate; and a grip that is rotatably supported so as to extend approximately vertically downward from the support plate and is formed so that a user can grasp.

The invention is characterized in that the vignetting preventing extension of the panoramic photography head has a grip portion formed so that a user can grasp.

The invention is characterized in that the lower plate of the panoramic photography head has an upper surface that is inclined downward as the surface advances toward an outer side.

Moreover, the present invention may provide a base plate used for photographing panoramic images.

That is, the invention is an approximately disk-shaped base plate which is mounted on a mounting surface, on which a monopod is placed, characterized in that each surface of the base plate includes: a recess in which a lower end of the monopod is placed at a center thereof so that alignment is realized easily; legs that make contact with the mounting surface at a plurality of contact points; and a direction indicator which includes a polygonal mark and in which a symbol is allocated to a side of the polygonal mark, the polygonal mark on one surface being different from that of the other surface.

Advantageous Effects of Invention

With the above-described configurations, the present invention provides the following advantageous effects.

Since the panoramic photography head according to the present invention has the upper plate, the vignetting preventing extension, and the lower plate which are integrated with each other, it is easy to carry the panoramic photography head and attach the same to the digital camera body. Since the legged platform connector of the lower plate is positioned vertically under the nodal point of the lens provided in the digital camera body, anyone can photograph a panoramic image without adjustment.

In particular, by using a monopod, it is possible to mount the panoramic photography head of the present invention on the monopod and to photograph images while grasping the head to change the orientation. In this case, the vignetting preventing extension prevents the head, the monopod, and the photographer himself or herself from being photographed in an image and contributes to satisfactory photographing of images.

Further, when a grip is provided in the panoramic photography head, it is possible to photograph panoramic images in a stable position when performing photographing without using a legged platform as well as using the monopod.

By using the base plate provided in the present invention, the monopod can be aligned accurately due to the recess at the center. In this case, since correct orientations can be aligned sequentially while seeing the polygonal marks and symbols, the convenience of photographing is improved with a simple structure.

DESCRIPTION OF EMBODIMENTS

Figure 1:
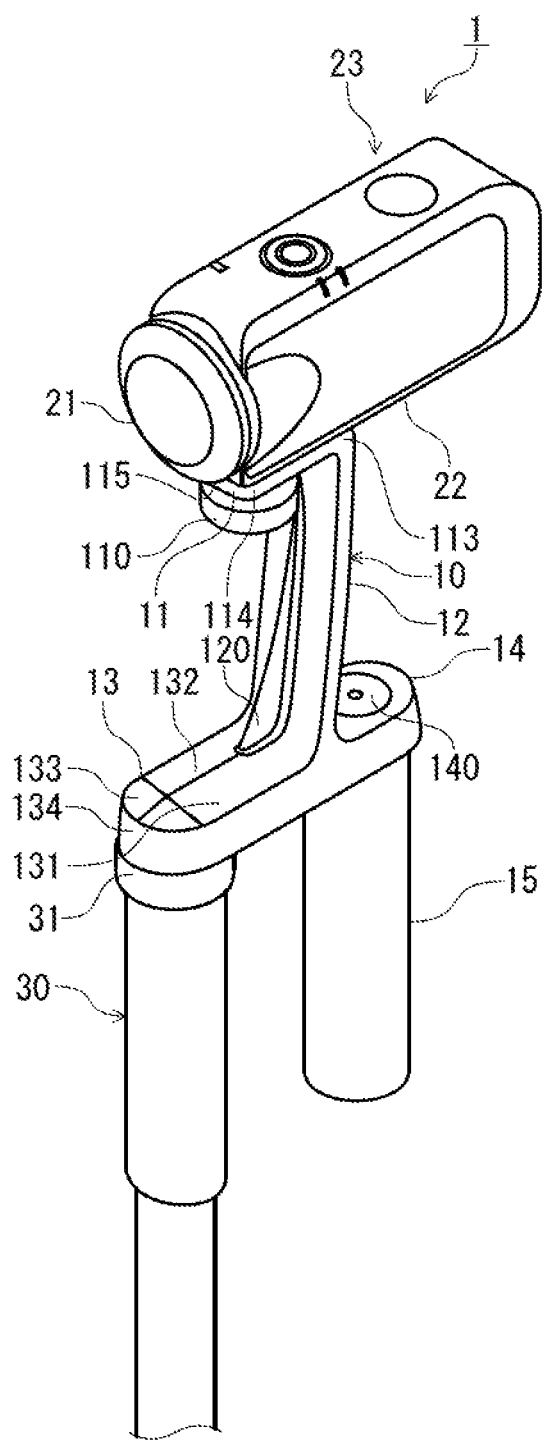
FIG. 1 is a perspective view of a panoramic photography system according to the present invention.

Hereinafter, an embodiment of the present invention will be described based on practical examples illustrated in the drawings. The embodiment is not limited to the below.

Figure 2:
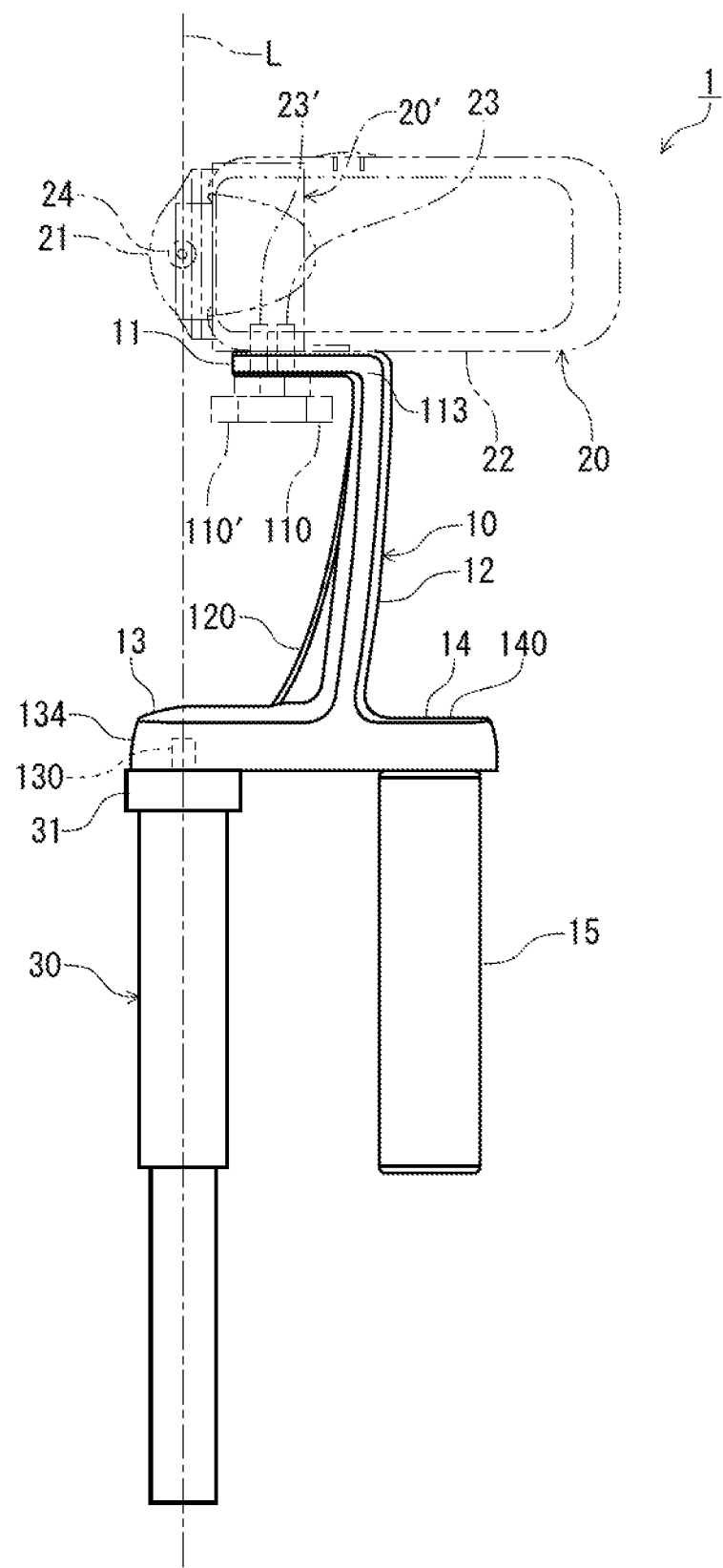
FIG. 2 is a front view of the panoramic photography system.
Figure 3:
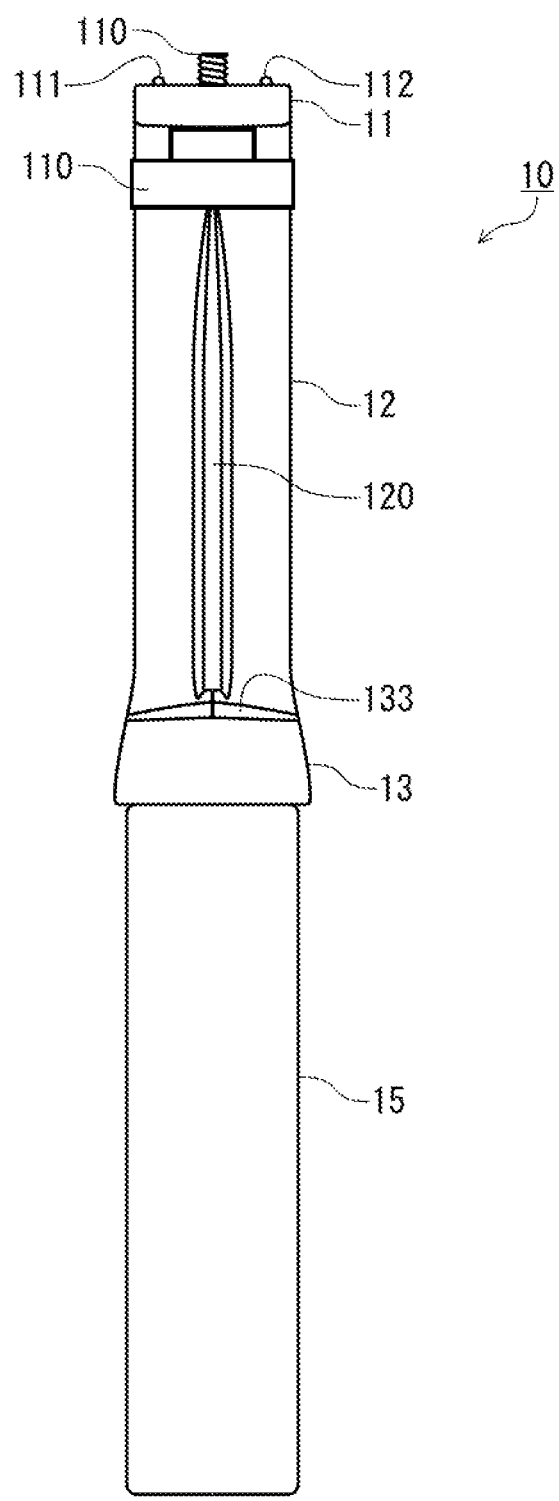
FIG. 3 is a left side view of a panoramic photography head according to the present invention.
Figure 4:
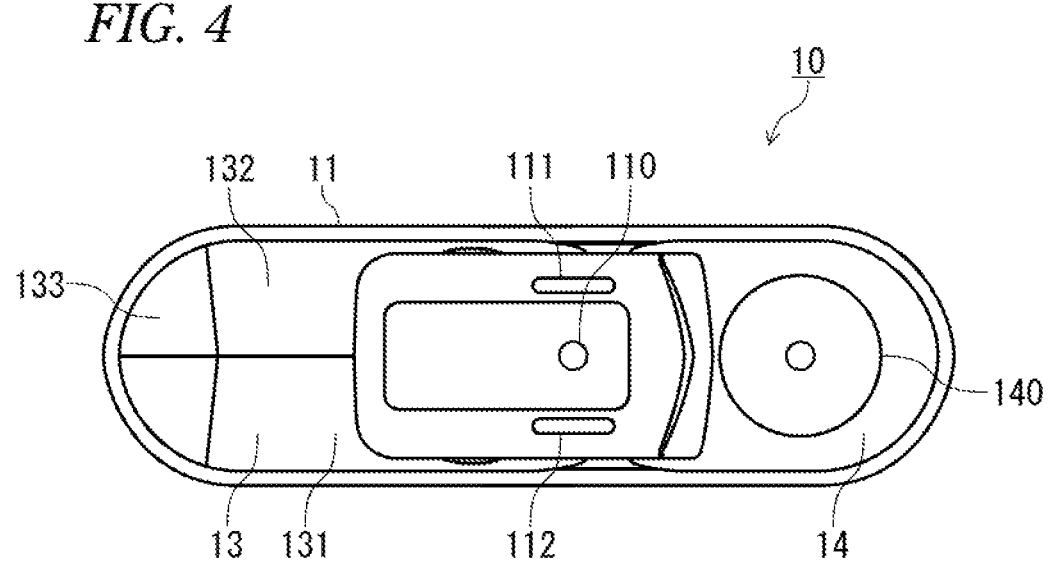
FIG. 4 is a plan view of the panoramic photography head according to the present invention.
Figure 5:
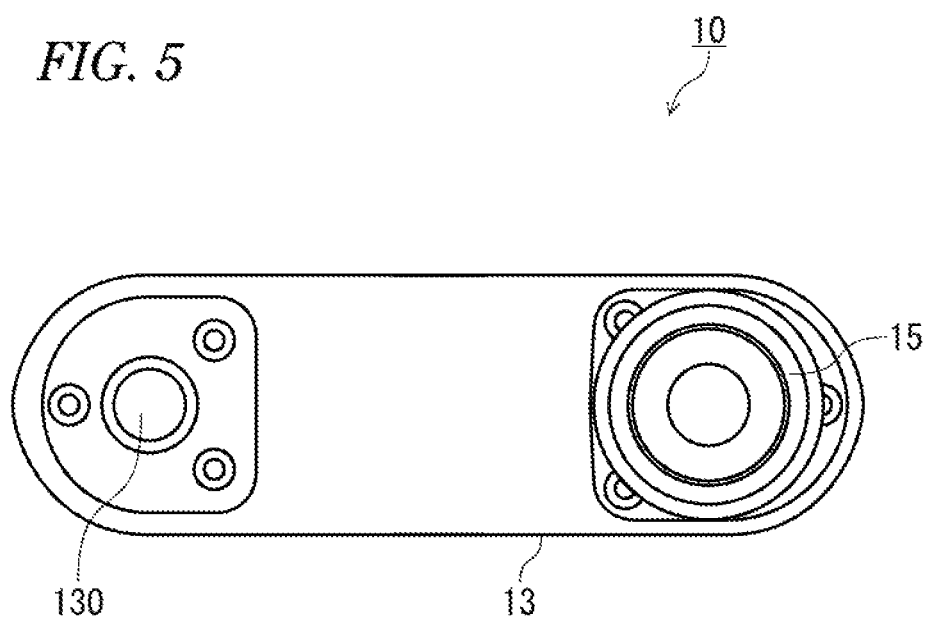
FIG. 5 is a bottom view of the panoramic photography head according to the present invention.
Figure 6:
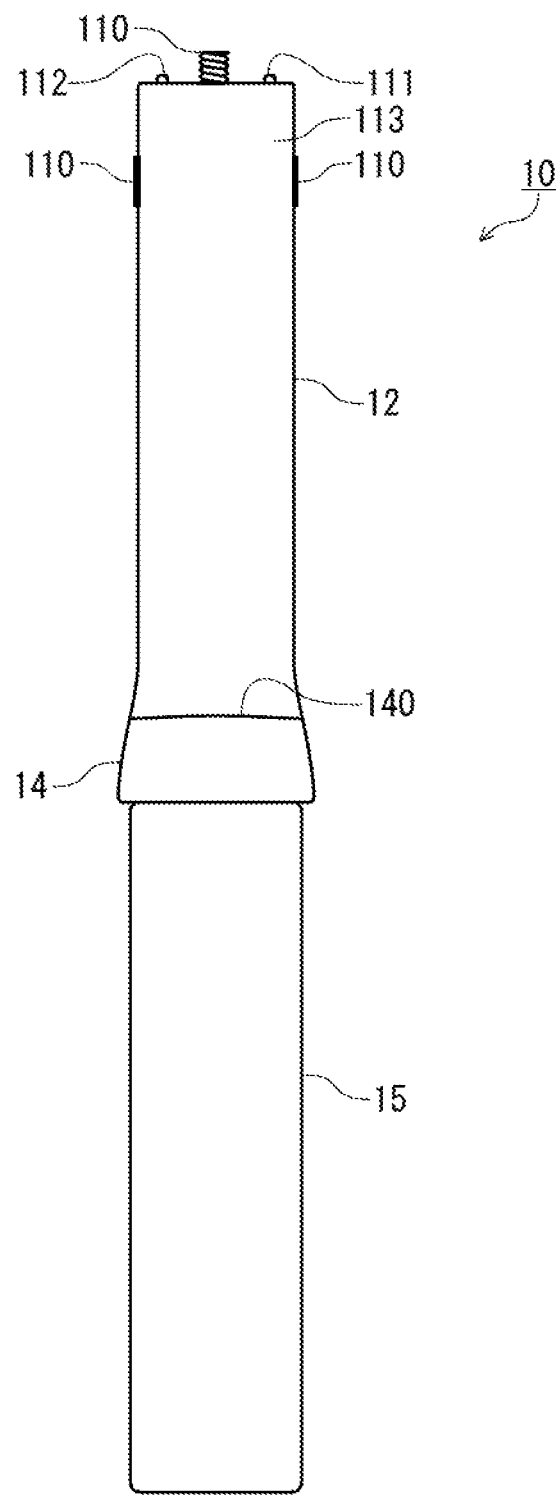
FIG. 6 is a right side view of the panoramic photography head according to the present invention.

The present invention is a panoramic photography system (hereinafter referred to as the present system) for photographing a plurality of images which are used for generating a panoramic image and of which the orientations are different, and has remarkable characteristics in a panoramic photography head (hereinafter referred to as a head), in particular. FIG. 1 is a perspective view illustrating a portion of the present system 1 and FIG. 2 is a front view of the system. FIG. 3 is a left side view of the head, FIG. 4 is a plan view of the head, FIG. 5 is a bottom view of the head, and FIG. 6 is a right side view of the head.

The present system includes the head 10, a digital camera body 20 having an ultrawide-angle lens 21 having a predetermined field of view (in particular, an angle of view larger than 180 degrees) at a front end, and a monopod 30 connected to a lower surface of the head 10.

Since the configurations of the digital camera body 20 and the monopod 30 are known, the description thereof will not be provided in the present practical example.

An attachment screw hole 23 for connection to a monopod or a tripod is formed in a lower surface 22 of the digital camera body 20 and forms a first connector of the present invention. Although the attachment screw hole 23 is also provided in many camera bodies 20, in the present system, a positional relation between the attachment screw hole 23 and a nodal point 24 of the lens 21 is an important factor, and the shape of the head 10 is determined by this positional relation. This will be described later.

The digital camera body 20 is disposed on an upper surface of an upper plate 11 of the head 10 and is fixed by an attachment screw 110 which is a second connector. As illustrated in FIG. 4, linear projections 111 and 112 are formed on both left and right sides (both upper and lower sides in the drawing) of the attachment screw 110 when seen from the front side of the camera. The projections engage with recesses (not illustrated) formed in the lower surface 22 of the digital camera body 20. In this way, the head 10 and the digital camera body 20 are maintained in a fixed directional relation.

In the panoramic photography system, if both head and body are rotated unexpectedly, it is not possible to photograph images in a correct direction, and to obtain images having a required angle of view. Thus, it is important to connect the two components so as not to be rotatable by engaging the projection and the recess of the first and second connectors.

The upper plate 11 extends horizontally toward the rear side of the camera and is bent downward at the rear end thereof. A vignetting preventing extension 12 extends from the bent portion 113 so as to be slightly inclined toward the front side.

With this inclination, when a photographer grasps the vignetting preventing extension 12, it is easy to provide the digital camera body 20 on the upper side and to perform photographing with no fear of being photographed as long as the vignetting preventing extension is grasped.

In this manner, in the present invention, the vignetting preventing extension 12 may ideally perform the function of a grip portion.

The vignetting preventing extension 12 secures a predetermined gap between the upper plate 11 and a lower plate 13 connected to the lower end thereof to prevent the lower plate 13 or the monopod 30 from being photographed in a panoramic image.

Figure 7:
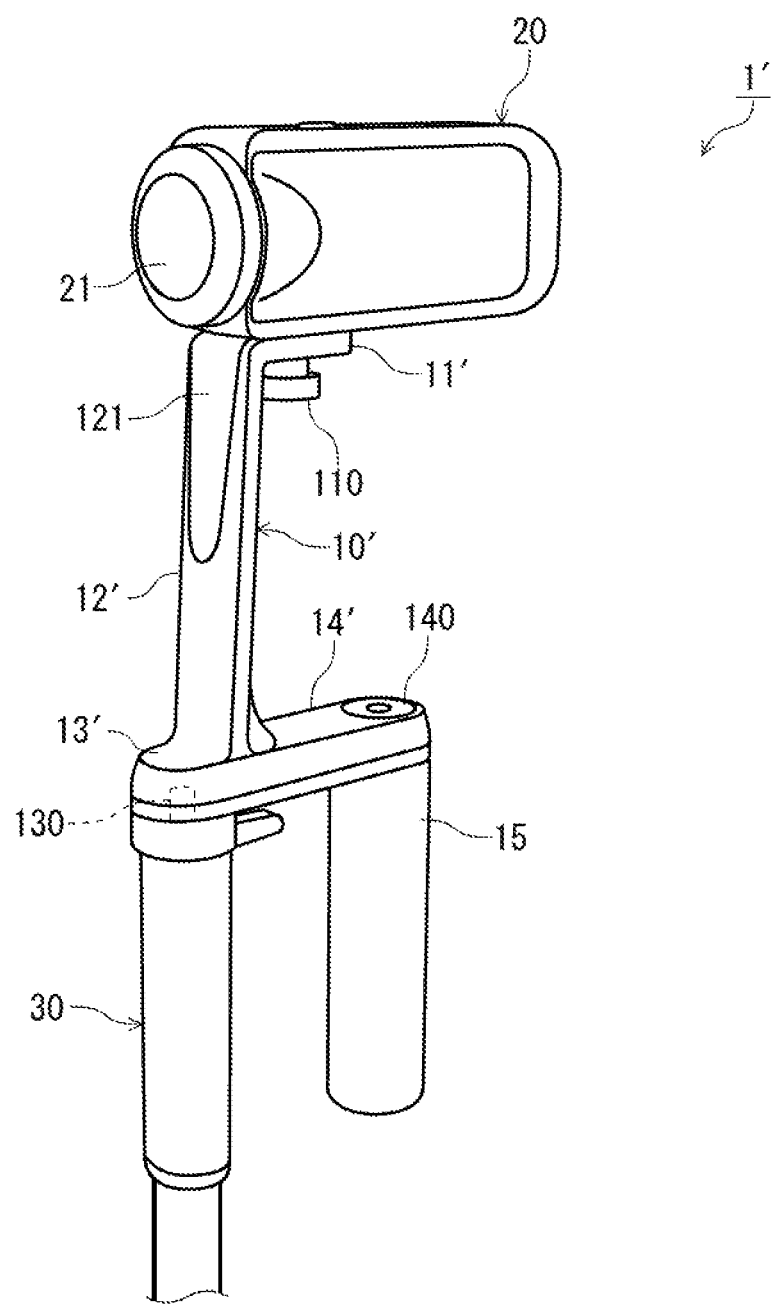
FIG. 7 is a perspective view of another practical example of the panoramic photography system according to the present invention.
Figure 8A:
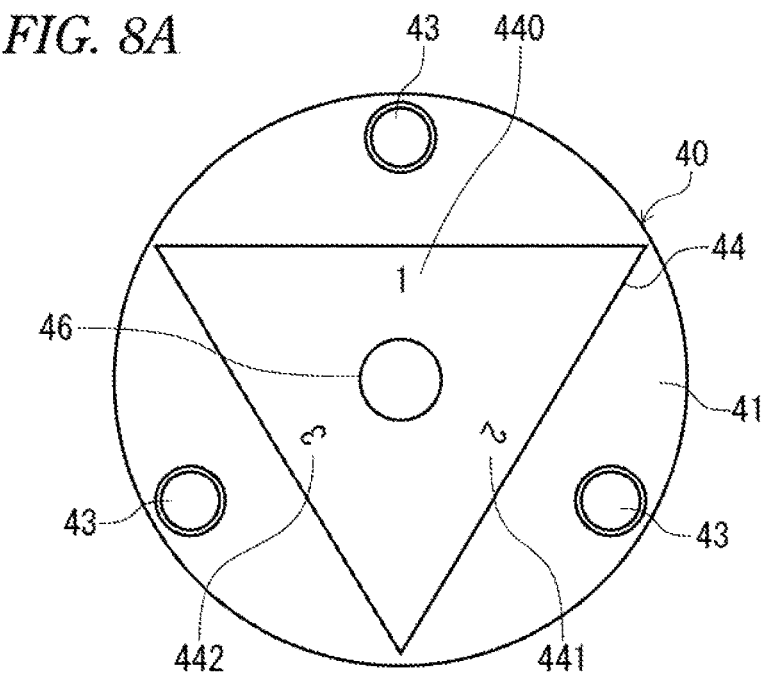
FIGS. 8A to 8C are explanatory views of a base plate according to the present invention.
Figure 8B:
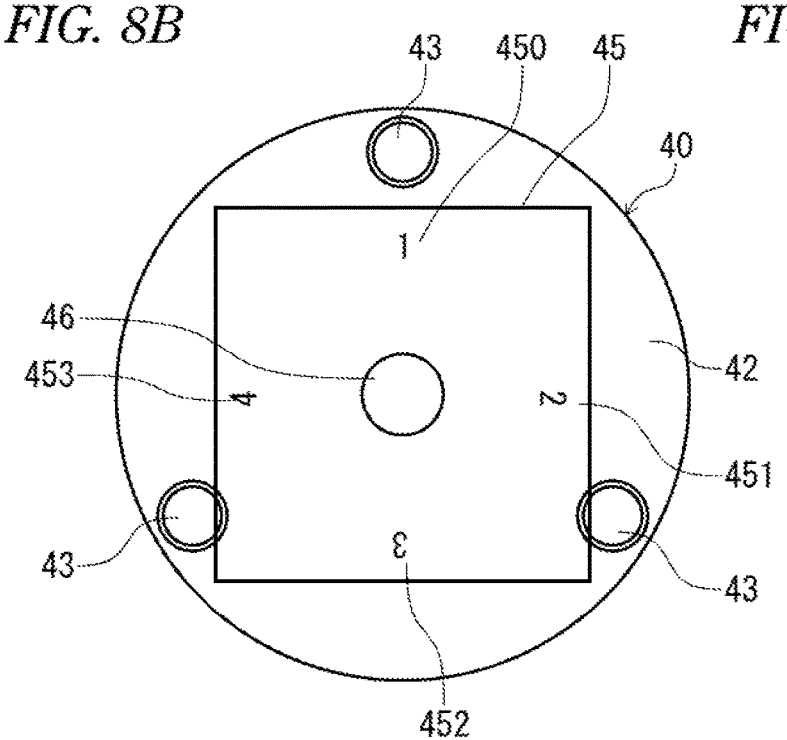
Figure 8C:
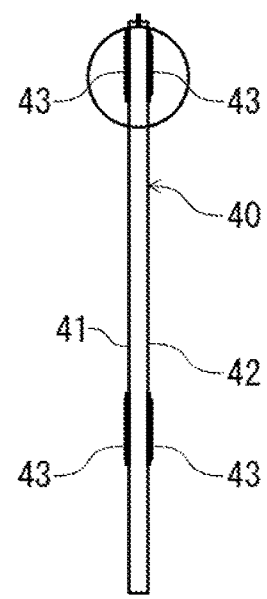
Figure 9:
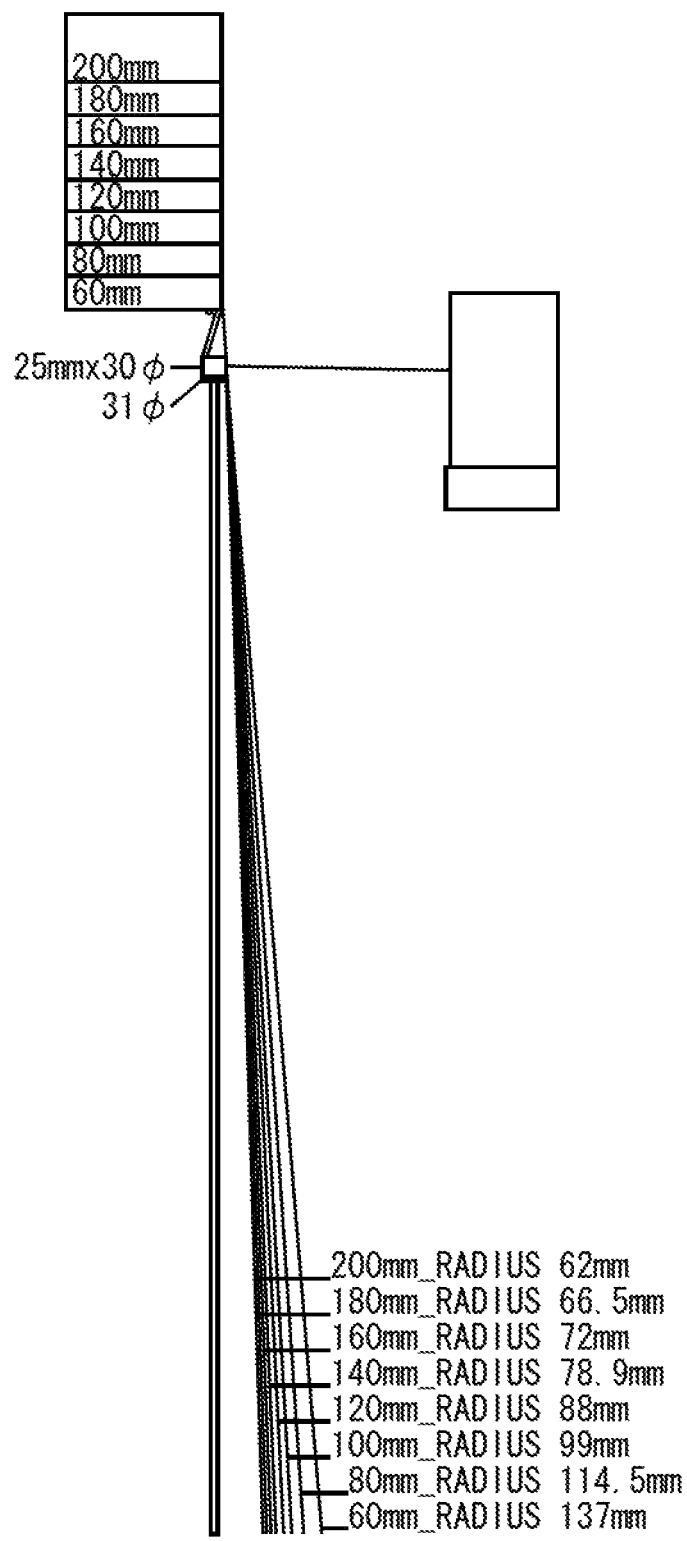
FIG. 9 illustrates a test example of determining the length of a vignetting preventing extension according to the present invention.

FIG. 7 illustrates a test example of examining a photographed range when the head according to the present invention, a monopod, and a digital camera body having an angle of view of 180 degrees. When the length between an upper end of a monopod and an upper end of a head is 60 mm, a connecting portion having a diameter of 31 mm between the monopod 30 and the lower plate 13 is photographed, and an area having a radius of 137 mm on a mounting surface becomes a vignette. On the other hand, when the length is 200 mm, the radius is 62 mm. This difference is remarkable when photographing a 360-degree panoramic image. In the present practical example, the length of the vignetting preventing extension 12 is set to approximately 13 cm based on this test.

In implementation of the present invention, although this length can be changed arbitrarily, the length is in the range of 60 mm to 200 mm from the test results. Moreover, when the vignetting preventing extension functions as a grip portion as described above, the length thereof is ideally approximately between 120 mm and 200 mm.

The vignetting preventing extension 12 is a plate having approximately the same width as the upper plate 11 and a reinforcement rib 120 extends from a lower portion to the lower plate 13 so as to protrude toward the front side. With this rib 120, the angle between the vignetting preventing extension 12 and the lower plate 13 is not misaligned, and images can be photographed in a stable orientation.

The lower plate 13 is formed approximately horizontally from the lower end of the vignetting preventing extension 12 so as to extend toward the front side. In the present practical example, a support plate 14 is formed integrally with the lower plate 13 so as to extend toward the rear side further than the vignetting preventing extension 13.

A legged platform screw hole 130 as a legged platform connector for connection to the monopod is formed in a lower surface of the front end of the lower plate 13, and the lower surface is fixed by a legged platform screw that protrudes upward from the monopod 30. The legged platform connector and the legged platform preferably engage with each other so as not to be rotatable so that a universal head that is freely rotatable is not provided in the monopod.

The connection portion between the lower plate 13 and the monopod 30 preferably has a diameter smaller than that of an upper end 31 of the monopod 30, and the monopod 30 itself is preferably as narrow as possible.

It is the most important point of the present invention that in this connection state, the legged platform connector is positioned vertically under the nodal point 24 of the lens 21 provided in the digital camera body.

In the present practical example, since a monopod is used, the legged platform screw and the legged platform screw hole 130 are disposed on the central axis of the monopod, and the upper plate 11 and the lower plate 13 are disposed so that the nodal point is positioned on the extension line L of the central axis.

As widely known, since the camera photographs images while rotating about the nodal point 24, it is possible to generate high-quality panoramic images without any distortion.

Since the nodal point is different depending on the lens 21, it is necessary to determine the position of the attachment screw 110 for each digital camera or lens in implementation of the present invention. Thus, it is preferable to use the head 10 having a dedicated design. By doing so, users can use the head easily.

Alternatively, in order to cope with two types of cameras having lenses with different nodal points, for example, the attachment screw 110 may be selectively attached to two holes so that users select a hole to which the attachment screw is to be fixed depending on a camera.

The alternative example is depicted by one-dot chain line in FIG. 2, in which an attachment screw 110' displaced toward the front side from the original attachment screw 110 engages with a screw attachment hole 23' of another digital camera 20'.

As another practical example, the upper plate 11 may be detachable from the vignetting preventing extension 12 so that the upper plate 11 only can be replaced depending on a digital camera or a lens. In this case, since it is only necessary to replace the upper plate with another suitable for a camera or the like, it is possible to provide a resource-saving and low-cost head.

In the present practical example, the support plate 14 rotatably supports a grip 15. The grip 15 has a sponge-shaped non-slip coating on the surface thereof so that a photographer can grasp the grip 15 reliably. Since the grip 15 formed such that a user can grasp is provided, even when the camera is at a high position, the camera can be held stably.

The grip 15 may not rotate but may be fixed to the support plate.

A level 140 may be provided on an upper surface of the support plate 14. In panoramic photography, a camera needs to maintain an accurate horizontal position, and a camera, a tripod, and the like having a level have been proposed from the past.

However, it is generally difficult for photographers to take a stable photographing position while checking the level, which becomes the causes of a tilt or a shake of a camera when a monopod as in the present practical example is used.

In the present practical example, since the level is provided immediately above the grip 15, photographers can perform horizontal alignment immediately and perform photographing with high precision.

The level may be provided on the upper surface of the lower plate 13 or on the rear-side surface of the vignetting preventing extension 12.

In the present invention, since it is assumed that the ultrawide-angle lens 21 is used in the digital camera body 20, structures for preventing the entrance of reflection light immediately from below the lens 21 and the occurrence of vignetting are employed.

As a first structure, corner portions 114 and 115 of the upper plate 11 are formed in a square and round form. By doing so, the corner portions 114 and 115 are prevented from being photographed in an image and the entrance of reflection light from the upper surface of the corner portions 114 and 115 is prevented.

As a second structure, an upper surface of the lower plate 13 is inclined downward as the surface advances toward the outer side. As obvious from FIG. 1, mountain-side inclined portions 131 and 132 are provided on both left and right sides of a portion disposed closer to the front side than the connection portion between the vignetting preventing extension 12 and the lower plate, and an inclined portion 133 that is inclined toward the left, right, and front sides is provided in a front end of the lower plate.

By doing so, even when the sunlight or illumination light enters the lower plate from above, the reflection light is reflected toward the outer side and is prevented from entering the lens 21.

Similarly, in order to prevent reflection of light, the head is preferably coated with a low-reflective paint or subjected to anti-glare surface treatment, and a paint having a color such as black that rarely reflects light is preferably used.

Moreover, in the present practical example, a thick portion 134 of the lower plate 13 is inclined toward the front side so that vignetting occurs rarely. As described above, the size of the thick portion 134 is preferably the same as or smaller than the size of the upper end of the monopod 30. In the present practical example, the thick portion is recessed closer to the inner side of the lower plate 13 than the upper end 131.

In the practical example, the vignetting preventing extension 12 is positioned on the rear side of the upper plate 11. This configuration is ideal because, when the photographer grasps the vignetting preventing extension 12 with his or her hand, the hand is rarely photographed in an image.

On the other hand, the vignetting preventing extension 12 may be positioned on the front side of the upper plate as long as this does not cause any problem in implementation of the present invention.

FIG. 5 illustrates another practical example corresponding to this configuration. A head 10' includes a vignetting preventing extension 12' that extends downward by being bent at a front end thereof, a lower plate 13' that extends toward the front side from a lower end of the vignetting preventing extension 12', and a support plate 14' that faces a rear side of the lower plate 13'.

In this configuration, the legged platform connector 130 of the lower plate 13' is positioned vertically under the nodal point 24 of the lens 21 similarly to the above. Moreover, since the vignetting preventing extension 12' is retracted as much as possible near the digital camera body 20 and is inclined toward the front side so as to follow an angle of view, it is possible to prevent the vignetting preventing extension from being photographed in an image.

Further, since a concave surface is formed in an upper portion of the front surface of the vignetting preventing extension 12', it is possible to prevent vignetting and to prevent bending of the vignetting preventing extension 12'.

FIG. 6 is an explanatory view of a base plate 40 according to the present invention. This base plate 40 is used together with the panoramic photography system and is mounted on a mounting surface such as a ground surface or a floor, and the lower end leg of a monopod is placed on the base plate.

The base plate has a generally disk shape and three rubber legs 43 are attached to side surfaces of both front and rear surfaces 41 and 42. The three legs are stable and a monopod can be stably held when the monopod is placed thereon. Moreover, due to the rubber legs, scratches on the floor surface can be prevented even when the monopod rotates on the base plate.

In the present practical example, a triangular mark is formed on the front surface 41, a rectangular mark is formed on the rear surface 42, and numbers 440 to 442 and 450 to 453 are allocated to respective sides of the triangular and rectangular marks, respectively. Moreover, a recess 46 with which the leg of the monopod makes contact is formed at the center, and the monopod rotates easily when the leg is aligned at the recess.

During photographing, an orientation may be determined by rotating the monopod so that respective sides are horizontal when seen from a photographer. In particular, by photographing images sequentially in numerical order, it is possible to perform photographing a necessary and sufficient number of times without being confused on the photographing orientation.

In the present practical example, although numbers 1 to 3 and 1 to 4 are used, optional symbols may be used as long as users can understand the sequence of the symbols.

Panoramic images are often generated by photographing images in about three to six directions and combining the photographed images. When a wide-angle lens having an angle of view larger than 200 degrees as in the digital camera body 20 used in the present invention is used, images can be superimposed sufficiently using the base plate 40 having two to four directions. Therefore, it is possible to reduce the time and labor incurred in photographing.

Naturally, the polygonal mark formed on the base plate 40 is optional. For example, hexagonal and octagonal marks may be used. The more the number of sides of a polygon, the higher the need of the symbols.

When images are photographed in two directions, although the rectangular mark may be used as a substitute, only one line may be formed on the base plate.

In the present practical example, although the entire panoramic photography system has been described, the present invention may be provided as the panoramic photography head 10 only or the base plate 40 only depending on implementation.

REFERENCE SIGNS LIST

1: Panoramic photography system
10: Panoramic photography head
11: Upper plate
12: Vignetting preventing extension
13: Lower plate
14: Support plate
15: Grip
20: Digital camera body
21: Lens
30: Monopod
40: Base plate

The invention claimed is:

1. An approximately disk-shaped base plate which is mounted on a mounting surface, on which a monopod is placed, the base plate being used for photographing a panoramic image, wherein
each surface of the base plate includes:
a recess in which a lower end of the monopod is placed at a center thereof so that alignment is realized easily;
legs that make contact with the mounting surface at a plurality of contact points; and
a direction indicator which includes a polygonal mark and in which a symbol is allocated to a side of the polygonal mark, the polygonal mark on one surface being different from that of the other surface.

* * * * *